United States Patent
De Wergifosse

(10) Patent No.: US 10,766,604 B2
(45) Date of Patent: Sep. 8, 2020

(54) SYSTEM FOR ELECTROMECHANICAL PITCH ACTUATION FOR A TURBINE ENGINE PROPELLER

(71) Applicant: SAFRAN AIRCRAFT ENGINES, Paris (FR)

(72) Inventor: Huguette De Wergifosse, Saint Augustin (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 323 days.

(21) Appl. No.: 15/849,464

(22) Filed: Dec. 20, 2017

(65) Prior Publication Data
US 2018/0170522 A1    Jun. 21, 2018

(30) Foreign Application Priority Data
Dec. 21, 2016 (FR) ...................................... 16 62959

(51) Int. Cl.
*B64C 11/32* (2006.01)
*B64C 11/44* (2006.01)
*F01D 7/00* (2006.01)

(52) U.S. Cl.
CPC ............ *B64C 11/325* (2013.01); *B64C 11/44* (2013.01); *F01D 7/00* (2013.01);
(Continued)

(58) Field of Classification Search
CPC ........ B64C 11/44; B64C 11/325; F02C 6/206; F01D 7/00; F01D 7/02; F05D 2260/75;
(Continued)

(56) References Cited

U.S. PATENT DOCUMENTS 2,370,135 A * 2/1945 Berliner .................. B64C 11/44
416/152
2,548,045 A * 4/1951 Nichols .................... B63H 3/04
416/155
(Continued)

FOREIGN PATENT DOCUMENTS

EP    2 378 081 A2    10/2011
EP    2 384 965 A2    11/2011
(Continued)

OTHER PUBLICATIONS

UK Search Report dated Jun. 18, 2018, issued in corresponding Application No. GB1721300.0, 3 pages.
(Continued)

*Primary Examiner* — Christopher Verdier
(74) *Attorney, Agent, or Firm* — Christensen O'Connor Johnson Kindness PLLC

(57) ABSTRACT

A pitch actuation system for a turbine engine propeller includes an actuator with movable part configured to rotate the blades of the propeller relative to the blade pitch axes. The actuator includes a transmission screw that is rotatable and movable in translation along a longitudinal axis, and a nut that engages the screw to move in translation along the longitudinal axis to adjust the pitch of the propeller blades. The actuator further includes non-rotatable decoupler for decoupling the rotation between the propeller and the nut. A blade feathering device has at least one electric drive motor and is configured to translate a member along the longitudinal axis. A blade pitch control device includes at least one electric motor configured to drive a rotor about the longitudinal axis, wherein that rotation rotates the screw and transmits translation of the member.

14 Claims, 2 Drawing Sheets

(52) U.S. Cl.
CPC .. *F05D 2220/324* (2013.01); *F05D 2220/325* (2013.01); *F05D 2260/40311* (2013.01); *F05D 2260/74* (2013.01); *F05D 2260/79* (2013.01); *F05D 2270/09* (2013.01); *F05D 2270/62* (2013.01)

(58) Field of Classification Search
CPC ............. F05D 2260/79; F05D 2260/74; F05D 2270/62; F05D 2220/324; F05D 2260/40311; F05D 2270/09; F05D 2220/325
See application file for complete search history.

(56) References Cited

U.S. PATENT DOCUMENTS

| | | | |
|---|---|---|---|
| 4,591,313 A | 5/1986 | Miyatake et al. | |
| 5,183,387 A | 2/1993 | Huggett et al. | |
| 8,167,553 B2 * | 5/2012 | Perkinson | B64C 11/36 416/1 |
| 2011/0014046 A1 * | 1/2011 | Gallet | F02K 3/072 416/1 |
| 2017/0306773 A1 | 10/2017 | de Wergifosse | |
| 2019/0106198 A1 * | 4/2019 | De Wergifosse | B64C 11/44 |
| 2019/0118936 A1 * | 4/2019 | De Wergifosse | B64C 11/44 |

FOREIGN PATENT DOCUMENTS

| | | |
|---|---|---|
| WO | 2013/076431 A1 | 5/2013 |
| WO | 2017/182734 A1 | 10/2017 |
| WO | 2017/182748 A1 | 10/2017 |

OTHER PUBLICATIONS

Search Report and Written Opinion for French Application No. 1662959, filed Dec. 21, 2016, 6 pages.

* cited by examiner

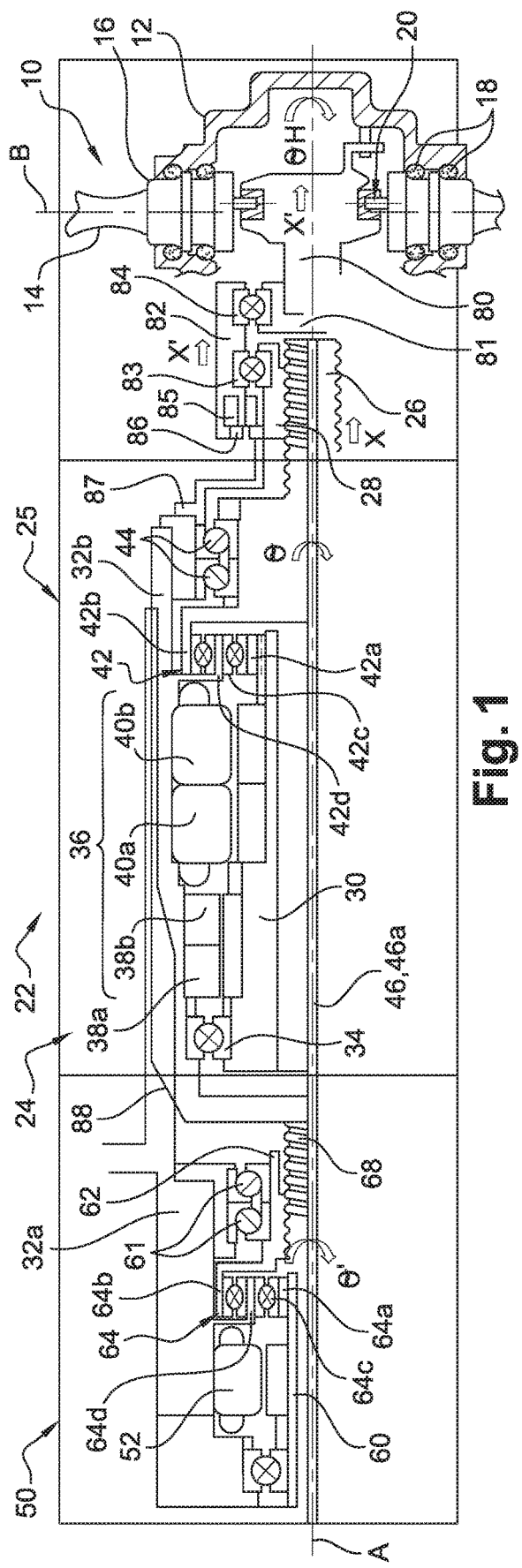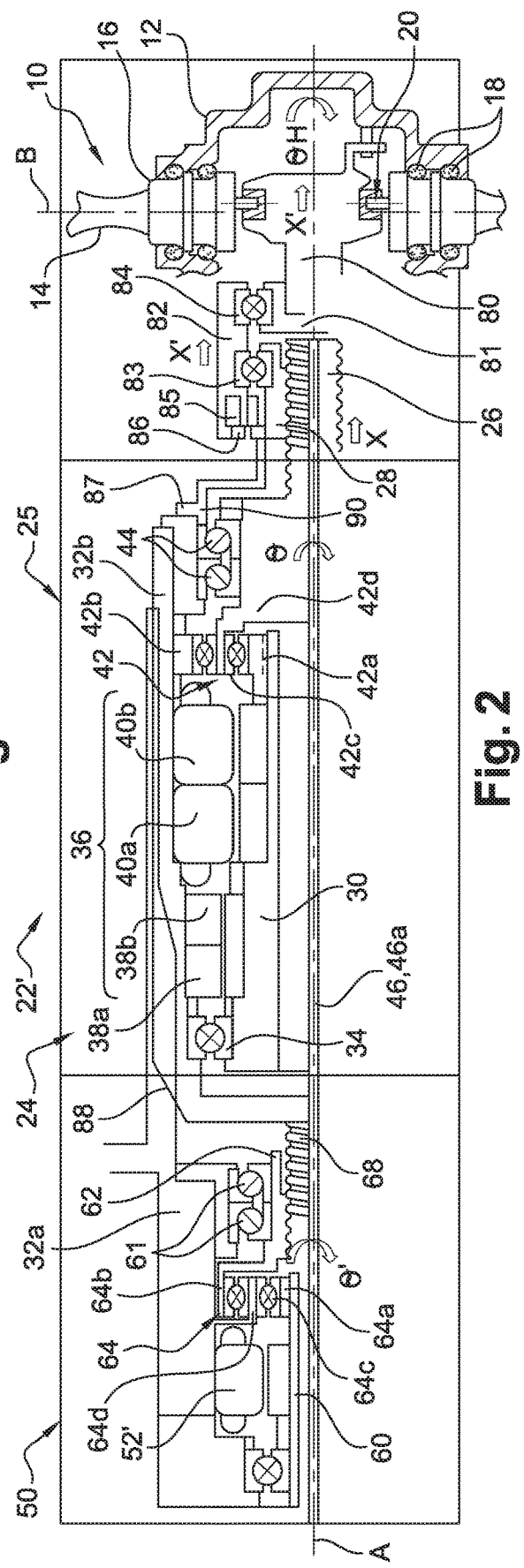

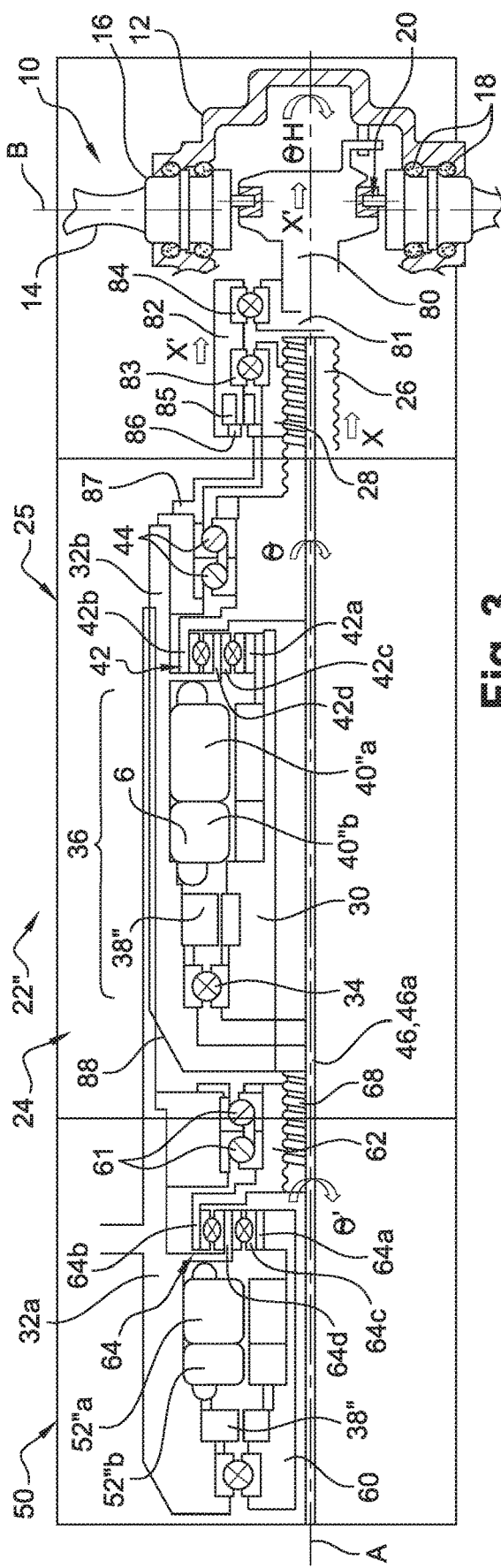
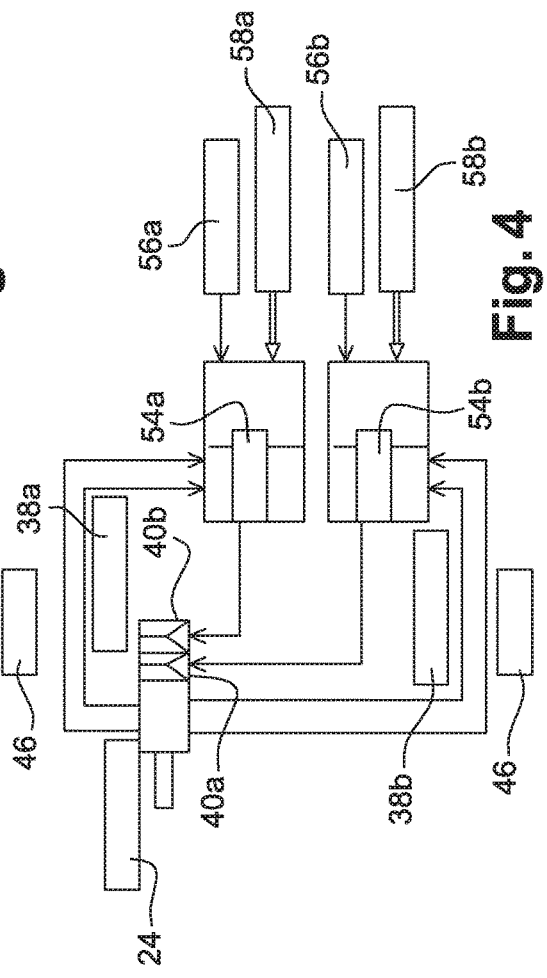
Fig. 3
Fig. 4

SYSTEM FOR ELECTROMECHANICAL PITCH ACTUATION FOR A TURBINE ENGINE PROPELLER

FIELD

The present disclosure relates to a pitch actuation system for a propeller of a turbine engine, such as a turboprop engine.

BACKGROUND

A turboprop engine comprises at least one propeller comprising a hub and blades that are supported by the hub and extend substantially radially outwards relative to the hub and to the axis of rotation of the propeller.

The turboprop engine is generally provided with a propeller pitch actuation system, also referred to as a propeller blade angular-pitch system. Adjusting the pitch of the propeller blades allows their efficiency to be improved while guaranteeing a propeller rotational speed for each flight phase.

Each blade can be rotated about an axis, which is generally radial, between a first emergency position, known as the feathering position, in which it extends substantially in parallel with the axis of rotation of the propeller, and a second position, in which it is sharply inclined relative to this axis. It can adopt any position between these two extreme positions.

In the prior art, the actuation system that is used is a hydraulic system, which is relatively complex and has several disadvantages. This system comprises an actuator of which one movable part is connected to the propeller blades so as to adjust their pitch.

The actuation system has to be able to provide not only the pitch control function, but also the emergency blade feathering function. The pitch actuation system thus comprises an auxiliary system for the emergency function.

A malfunction associated with a hydraulic leak, which is a mode common to the pitch control system and the auxiliary system, has to be covered. Without a pressure source, it is essential to add counterweights to the blades in order to provide the feathering function.

The pitch actuation system also has to provide protective functions in the event of overspeed, engine cut-out and failure of the FADEC (Full Authority Digital Engine Control) computer, and has to ensure that low pitches are limited during flight. A set of mechanical systems and hydraulic systems thus form part of the pitch actuation system for providing these functions in the prior art.

The pitch control system is also subject to extremely strict malfunction rate requirements, which entail redundancy and additional protection systems.

To conclude, the technology and the operating principle of a hydraulic propeller pitch actuation system are currently complex. These systems are integrated in a wide range of hydraulic components.

The present invention makes it possible to overcome these disadvantages and provides a solution to all or some of the aforementioned problems of the prior art.

The first problem (problem A) relates to the strict FHA (functional hazard assessment) requirements for pitch control, which entail robust architectures with redundancy.

The second problem (problem B) relates to the feathering function, which has to be able to be provided even after a failure of the pitch control means.

The third problem (problem C) relates to the risk of the movable part of the actuator locking. In a hydraulic system, a blade of the propeller is rotated by the translational movement of an eccentric at the root of the blade. Axial locking of the hydraulic cylinder is considered to be a failure.

Furthermore, in a hydraulic system, the rotation of the propeller is transmitted to the hydraulic actuator positioned in the rotating frame of reference (piston and body without angular movement). This cylinder is fed by pipes via a hydraulic spool positioned in the fixed frame of reference. In this hydraulic concept, the rotation of the propeller does not cause any offset of the propeller pitch. The fourth problem (problem D) relates to the management of this phenomenon.

Finally, the fifth problem (problem E) relates to the protective functions other than those covering the failure of the pitch control; these functions require additional mechanical and hydraulic devices in a hydraulic system of the prior art.

SUMMARY

The invention proposes a pitch actuation system for a turbine engine propeller, comprising an actuator having a main transmission screw configured to be connected to blades of the propeller so as to rotate them relative to the blade pitch axes, characterized in that the actuator is an electromechanical actuator comprising:
- the main transmission screw that is rotatable and movable in translation along a longitudinal axis,
  - a main nut through which said transmission screw passes and which engages with said screw in order to move in translation along the axis,
  - a decoupling means that includes a movable ring, a first angular contact anti-friction bearing, and a second angular contact anti-friction bearing, the decoupling means being configured such that, when the main nut moves in translation, the pitch of the propeller blades is adjusted but rotation of the propeller does not lead to rotation of the main nut,
  - first blade pitch control means, comprising at least one electric motor for driving a first rotor about the axis, the main transmission screw being rotated by said first rotor,
  - second blade feathering means, comprising at least one second electric motor for driving a second rotor about the axis, and a transmission device, for example a screw/nut, comprising a first member, for example a nut, that is rotated by said second rotor, and a second member, for example a screw, that engages with said first member in order to move in translation along the axis, the assembly being designed such that said second member is locked when said second electric motor is not activated,
  - and in that the first blade pitch control means are designed so as to transmit to the main transmission screw the translation of the second member of the transmission device of the second blade feathering means, and so as to prevent the rotation of the main screw when the second feathering means are activated.

When the pitch is being controlled, the translation of the second member of the transmission device is prevented by the reluctance torque of the second electric motor. The main transmission screw is therefore active when the pitch is being controlled and the transmission device of the second feathering means is inactive.

When the blades are being feathered, said translational movement of the main transmission screw is transmitted to the main nut since said main transmission screw is prevented from rotating by the reluctance torque of the first electric motor. The main transmission screw is therefore inactive when the blades are being feathered and the transmission device for feathering the blades is active.

In a hydraulic system, a blade of the propeller is rotated by the translational movement of an eccentric at the root of the blade. A failure resulting from the axial locking of the hydraulic cylinder (problem C), which generates this translational movement, is considered to be highly unlikely. This low malfunction rate value appears to be supported by feedback. In the system according to the invention, the basic system has transmission screw redundancy:

if the main transmission screw is locked in the main nut, the feathering can still be brought about by the second rotor of the feathering means, said rotor translates the second member of its transmission device, which thus transmits a translation from the set of the first means to means for coupling to the propeller. Indeed, the first electric motor of the first pitch control means need not be activated in order to prevent the rotation of the main transmission screw since said screw is locked by the anti-rotation means of the main nut, if the translation transmission device of the second pitch control means is locked, the pitch control and feathering can still be brought about by the first rotor, which simply rotates the first main transmission screw. Indeed, by activating the first means, the main nut is translated by the rotation of said transmission screw since the second member of the transmission device is prevented from translating.

Making the screw excessively large is one solution to the aforementioned problem C. However, the fatigue design of the screw does not cover all the aspects related to the various breakdowns (pollution, ice, etc.). This need can be satisfactorily met by means of the invention.

With respect to problem E, unlike in the hydraulic system the proposed concept does not require any additional device in order to cover the protective functions other than those covering the failure of the pitch control. In a hydraulic system, engine cut-out or loss of engine power results in the removal of the hydraulic energy from the pump coupled to the engine, meaning an auxiliary system needs to be provided. In an electromechanical system, in the event of these types of malfunctions, the electrical energy is supplied by an independent source. The feathering function thus remains active in order to cover these types of malfunctions, preferably by means of a protection unit. In a hydraulic system, the case of overspeed is covered by a mechanical counterweight system. In the electromechanical system, preferably by virtue of speed feedback, the engine control laws can act on the electric pitch control motors via the protection unit in order to provide the feathering.

In addition, decoupling the rotation of the propeller by means of the actuator makes it possible to maintain the blade pitch without rotating the electric motors when the propeller is rotating, thus reducing energy consumption and minimising motor wear. Without this decoupling, the size of the rotating machines and of the electronic unit would be adversely affected because the size depends on the electrical power to be supplied.

Preferably, at least one electric motor of the second blade feathering means is arranged so as to have a resisting reluctance torque capable of preventing the first member of the transmission device of the second means from rotating.

In this way, the first means can control the blade pitch by simply rotating the main transmission screw, while keeping the second feathering means inactive. In this case, the first pitch control means can additionally remain stationary when carrying out their function, thus improving operational reliability. Indeed, the larger electric motors are integrated in the first pitch control means, and so it is preferable, in order to minimise the fatigue loading, for the translational movement of this casing to be limited during the pitch control.

Advantageously, said at least one electric motor of the second feathering means comprises a stator supported by a first immovable casing, and said at least one electric motor of the first pitch control means comprises a stator supported by a second casing that is mounted solely so as to slide in translation along the axis within the first casing.

Advantageously, the second member of the transmission device of the second feathering means is mounted on the second casing.

Preferably, the main transmission screw is connected to an external ring gear of a first planetary reduction gear, the first rotor being connected to a planetary shaft of said first reduction gear, and/or the first member of the transmission device of the second means is connected to an external ring gear of a second planetary reduction gear, the second rotor being connected to a planetary shaft of said second reduction gear.

This configuration of reduction gears makes it possible to prevent the main transmission screw from rotating when the first rotor is prevented from rotating, and/or to prevent the first member from rotating when the second rotor is prevented from rotating. In particular, the reluctance torque of the second motor thus makes it possible to prevent the main transmission screw from rotating when the second feathering means are inactive, allowing the first blade pitch control means to simply rotate the transmission screw.

In a first embodiment, said first blade pitch control means comprise a chain of electronic components (a controller), which is designed to control said at least one first motor such that it applies a resisting torque capable of preventing the main transmission screw from rotating when the second feathering means are activated.

In a second embodiment, the first pitch control means comprise at least one mechanical device for preventing the main transmission screw from rotating, which device is arranged so as to engage when said at least one motor of said first means is not exerting any torque on the first rotor and so as to unlock as a result of axial forces exerted by said motor on the first rotor.

In this embodiment, the first pitch control means do not have to be activated in order to prevent the main transmission screw from rotating and, at the same time, the first electric motors do not need to produce a reluctance torque, thus allowing the second blade feathering means by simply rotating the second transmission screw.

In a variant, the first blade control means comprise at least one motor that is arranged so as to have a resisting reluctance torque capable of preventing the main transmission screw from rotating.

On the other hand, the second feathering means also comprise an electric motor which, for its part, is arranged so as to have a resisting torque capable of locking the first transmission member.

In a third preferred embodiment, said first and second means both comprise a first and a second electric motor for driving the same rotor, the first motor, preferably synchronous motor, being controlled by a chain of electronic components that is designed to control the blade pitch, the second motor, preferably asynchronous motor, being controlled by a chain of electronic components that is designed to feather the blades.

This embodiment gives the first and second means equivalent functions of both feathering and pitch control, it prevents the electric motors being excessively large and increases the reliability of the actuation system, in particular if the bearings that hold the main transmission screw within the movable casing becoming locked.

Advantageously, said first means comprise two, preferably synchronous electric motors for driving the same first rotor. The selection of the technology and the design strategy for these electric means allows the short-circuit torque to be minimised and results in reasonably sized motors. The electric redundancy in the electric motors allows the FHA reliability requirements to be met (problem A). In order to maintain a simple architecture, sharing the rotors of the electric motors is proposed in this case. This makes it possible to maintain just one transmission chain and to provide a relatively compact system. The proposed concept offers this advantage.

The proposed system is preferably capable of providing the required reliability by electric redundancy on the electrical components, on the control and on independent power supply circuits controlled by a computer. This system is thus capable of providing its pitch control function even in the event of a short-circuit in the electrical power supply.

This electromechanical concept may not require any mechanical energy from the turbine engine. Malfunctions involving loss of engine power and engine cut-out can thus be covered by the nominal electromechanical system by means of a protection unit, without any additional device. This electromechanical concept also allows the event of overspeed and the failure of the FADEC to be covered without an additional device.

The system according to the invention can comprise one or more of the following features, taken independently of one another or in combination with one another:
  the main transmission screw is connected to the first rotor by means of a first reduction gear, for example a planetary reduction gear,
  the second rotor is connected to the first member of the transmission device of the second means by means of a second reduction gear, for example a planetary reduction gear,
  a planet carrier of the reduction gear or of each reduction gear is rotationally guided by a pair of inverted angular contact bearings,
  said first means comprise at least two resolvers; and
  the two electric motors of said first means are connected, respectively, to two separate electronic control units.

The present invention further relates to a turbine engine, such as a turboprop engine, comprising a propeller, the blades of which are variable-pitch blades, and to a system as described above, wherein the main nut drives means that engage with eccentrics provided on plates for supporting and rotating the blades.

Finally, the present invention relates to a method for actuating the pitch of the blades of a turbine engine propeller, by means of a system described above, comprising the following steps:
  adjusting the blade pitch by actuating a motor of the first pitch control means, in such a way that rotation of the first rotor leads to rotation of the main transmission screw,
  feathering the blades by actuating a motor of the second feathering means, in such a way that rotation of the second rotor causes the main transmission screw to move axially.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a partial schematic axial cross section showing half of a first representative embodiment of a blade pitch actuation system according to the present disclosure, connected to a turbine engine propeller;

FIG. 2 is a partial schematic axial cross section showing half of a second representative embodiment of a blade pitch actuation system according to the invention, connected to a turbine engine propeller;

FIG. 3 is a partial schematic axial cross section showing half of a third representative embodiment of a blade pitch actuation system according to the present disclosure, connected to a turbine engine propeller; and FIG. 4 is a partial schematic axial cross section showing half of a third representative embodiment of a blade pitch actuation system according to the present disclosure, connected to a turbine engine propeller.

DETAILED DESCRIPTION

Firstly, reference will be made to FIG. 1.

A propeller 10 for a turbine engine, and in particular a turboprop engine, is generally unducted and comprises a movable hub 12 (arrow θ' in FIG. 1) having an axis of rotation A, the hub supporting blades 14 which extend substantially radially relative to the axis A. Each blade 14 is connected at its radially inner end to a substantially cylindrical plate 16 for supporting and rotatably guiding the blade in order for it to rotatably pitch about an axis B, which in this case is substantially radial. The plate 16 of each blade 14 is mounted in a compartment of the hub 12 and is centred and guided in said compartment by bearings 18 extending around the axis B. The radially inner end of each blade comprises an eccentric 20, which is rigidly connected to the plate 16 and can be rotated about the axis B by an actuation system 22. The movement of the eccentrics 20 causes the plates 16 and thus the blades 14 to rotate about the axes B. Each blade 14 can be set to a pitch or in a given position about its axis B between two extreme positions, one of which, known as the feathering position, corresponds to the case where the chord of the transverse section of the blade extends substantially in parallel with the axis A.

In the prior art, the actuation system was hydraulic and had various disadvantages. FIG. 1 shows an electromechanical actuation system.

The actuation system 22 in FIG. 1 comprises an electromechanical actuator 24 having an immovable casing 32a and a casing 32b that can move in translation along the axis A but which cannot rotate about said axis A due to anti-rotation means 88. The means 88 can be slide rails on the immovable casing 32a.

The actuation system 22 further comprises a movable part that comprises a transmission screw 26 associated with a nut 28.

The transmission screw is rotatable about the axis A (arrow θ) and can move in translation along said axis (arrow X).

The nut 28 is translationally guided relative to the hub 12 by means 87 for preventing the nut 28 from rotating on the transmission screw 26. In this case, said means 87 comprise an axial finger that is supported by the movable casing 32b and inserted in a compartment having a shape complementary to the nut 28. The nut 28 is thus likewise arranged so as to be translatable relative to the axis A in the same fixed frame of reference.

The transmission screw 26 passes through the nut 28 and thus comprises a thread that is complementary to that of the nut. It should be understood that the rotation of the transmission screw 26 (arrow θ in FIG. 1) causes the nut 28 to move in translation along the axis (arrow X'). The transmission screw 26 advantageously has a reversibility function in that it can be subjected to a rotational torque by the actuator so as to engage with and move the nut, and can also be subjected to axial forces by the nut that cause the transmission screw to be rotated. In this respect, said screw differs from an endless screw, which has no reversibility function.

The transmission screw can also be subjected to axial forces by the actuator 24. In this case, it should be understood that an axial movement (arrow X) of the transmission screw causes the nut 28 to move axially too (arrow X'), by the same amount if the transmission screw is also prevented from rotating (θ=0).

As described further below and shown in the figures, blades 14 are connected to eccentrics 20 (so as to rotate said blades relative to the axis B), which are connected to the actuator 24 by a decoupling means that includes a movable ring 82, a first angular contact anti-friction bearing 83, and a second angular contact anti-friction bearing 84.

The member 80 is movable in translation and rotatable relative to the axis A. It comprises openings for receiving the eccentrics 20 of the blades 14 and is thus connected for conjoint rotation with the blades 14. The member is thus designed to rotate together with the propeller 10 about the axis A, following the rotation OH of said propeller. The member's translational movements along the axis A make it possible to move the eccentrics and thus the blades 14 about their axes B.

The member 80 has a cylindrical end inserted in a blind hole in a sleeve 81. The nut 28 and the sleeve 81 are surrounded by a movable ring 82. A first angular contact anti-friction bearing 83 (in this case a ball bearing) is mounted between the nut 28 and the ring 82 and a second angular contact anti-friction bearing 84 (ball bearing) is mounted between the sleeve 81 and the ring 82. Conventionally, the internal ring of each bearing 83, 84 is connected for conjoint rotation with the nut 28 or the sleeve 81, respectively, and the external ring thereof is connected for conjoint rotation with the ring 82.

The angular contact bearings 83, 84 make it possible to transmit the translation X' of the nut 28 to the member 80 and then to the eccentrics 20 subjected to the rotation of the propeller 10. The movement of the eccentrics 20 in turn leads to the blades 14 rotating relative to the axis B. The movement of the eccentrics depends on the balance between the external force and the force produced by the actuator 24 by means of the transmission screw 26.

By contrast, the rotation OH of the propeller is decoupled from the movement of the nut 28 owing to the angular contact bearing 84. Therefore, the movement of the nut 28 can be restricted to translation.

In addition, the transmission screw 26 does not have to rotate in order to maintain the pitch of the propeller blades since the rotational movement of said screw is decoupled from that of the propeller by the mechanism described above.

In addition, an electric motor 85 is mounted between the nut 28 and the ring 82 and comprises a stator rigidly connected to the nut and a rotor rigidly connected to the ring.

Said motor 85 is associated with a sensor 86, which is also mounted between the nut 28 and the ring 82 and comprises a stator element rigidly connected to the nut and a rotor element rigidly connected to the ring. The sensor is a Hall effect sensor or an inductive sensor for monitoring the rotation of the external ring.

The decoupling means further comprise a device for monitoring the state of the two bearings 83, 84 when the engine is stationary. This device consists of the motor elements 85 and the sensor elements 86. When the engine is stationary, the motor 85 rotates the external ring of the two bearings 83, 84 while supplying a torque that is sufficient to overcome the friction in these two bearings. The rotation of the external ring is then controlled by the sensor 86. If just one of these two bearings seizes up or ages, the deterioration can be noted in both the value of the current from the motor and the rotation of the external ring. This device thus eliminates any risk of dormant failure prior to flight. If one of the angular contact bearings becomes locked, the other provides the decoupling and prevents the anti-rotation means from breaking.

This electromechanical concept, owing to the decoupling of the rotation of the propeller and its monitoring device, makes it possible to reduce the power of the actuator, the size of all the electrical components and the size of all the mechanical components since it reduces the loading thereon.

The actuation system 22 further comprises at least one LVDT sensor 46 (linear variable differential transformer). In the example shown, the transmission screw 26 comprises an internal axial bore, in which a ferromagnetic LVDT plunger 46a is slidably inserted, which plunger is supported by a rear cowl of the actuator 22, which is in turn fastened to the immovable casing 32a. Although this is not shown, the plunger 46a is surrounded by a plurality of windings supported by the transmission screw 26, at least one primary winding of which is powered with an alternating current, and two secondary windings. Said windings are preferably redundant in order to increase the reliability of the system. The axial movement of the plunger 46a inside the coils channels the flux and generates voltages in the secondary windings, the amplitudes of which depend on the position of said plunger. The sensor 46 thus provides a voltage that is proportional to the movement of the plunger 46a.

The actuator 24 comprises first electric means 36 for controlling the blade pitch, which drive a rotor 30. The rotor 30 has an elongate shape having an axis A and is in this case guided in the movable casing 32b by at least one bearing 34. The bearing 34 (in this case an anti-friction bearing and more specifically a ball bearing) is mounted at the axial end of the rotor 30, on the opposite side from the propeller (left-hand end in the drawing).

In the embodiment shown in FIG. 1, the electric means 36 comprise two resolvers 38a, 38b and two electric motors 40a, 40b, which in this case are synchronous machines. The resolvers 38a, 38b are arranged next to each other and have the axis A as a common axis. The electric motors 40a, 40b are arranged next to each other and also have the axis A as a common axis. The resolvers 38a, 38b in this case are arranged between the bearing 34 and the electric motors 40a, 40b.

Each resolver 38a, 38b comprises a resolver rotor mounted on the common rotor 30 and a resolver stator rigidly connected to the movable casing 32b. The resolver rotors and stators generally consist of windings. In a known manner, a resolver allows an electric value to be obtained from changing the angle of a rotor. A resolver operates as a transformer, the coupling of which varies with the mechanical angle of the rotor. When the rotor winding is excited using an alternating voltage, an alternating voltage is recovered on the winding of the stator. The redundancy associated with the use of two resolvers 38a, 38b instead of one allows the aforementioned reliability requirements to be met.

Each electric motor 40a, 40b in this case is a synchronous machine and comprises a rotor mounted on the common rotor 30 and a stator rigidly connected to the movable casing 32b. The rotor may consist of permanent magnets, or of a coil supplied with direct current and a magnetic circuit (electromagnet). In order to produce the current, an outside force is used to rotate the rotor: the magnetic field thereof, by rotating, induces an alternating electric current in the coils of the stator. The speed of this rotating field is known as "synchronism speed". The synchronism speed is directly related to the frequency of the electrical power supply. The motors in this case are fed by a three-phase current system.

As can be seen in the drawing, the common rotor 30 drives the transmission screw 26 by means of a speed-reduction gear 42, which in this case is a planetary reduction or an epicyclic gear. This reduction gear 42 comprises a planetary shaft 42a connected for conjoint rotation with the common rotor 30, an external ring gear 42b that surrounds the planetary shaft, and planet gears 42c that mesh with the planetary shaft 42a and the ring gear 42b and are supported by a planet carrier 42d. In this case, the external ring gear 42b is rigidly connected to the transmission screw 26, whereas the planet carrier 42d is rigidly connected to the movable casing 32b. In the example shown, the transmission screw 26 and the external ring gear 42b are formed as a single piece.

This configuration, in which the screw 26 is fastened to the ring gear 42b and the planet carrier 42d is fastened to the casing 32b, makes it possible to lock the transmission screw 26 when a resisting torque is produced on the rotor 30 of the first electric motor means 40a, 40b.

The part comprising the external ring gear 42b and the transmission screw 26 is centred and guided in the movable casing 32b by a pair of anti-friction bearings, in this case ball bearings. These bearings 44 are angular contact bearings. They are inverted and mounted one next to the other between the reduction gear 42 and the screw 26.

The transmission screw 26 can therefore be rotated about the axis A owing to a torque provided by the first electric means 36, but the screw is prevented from moving in translation relative to the movable casing 32b by the bearings 44, which absorb the axial forces on said casing.

The turboprop engine is provided with an auxiliary system 50 for feathering the blades 14; in this case, it is an electromechanical system. The system 50 is incorporated in the actuator 22 and comprises an electric motor 52, which is in this case a reluctance torque synchronous machine 52.

The stator of the electric motor 52 of the feathering means 50 is fastened to the immovable casing 32a between the first electric means 36 and the axial end of the actuator 22 on the opposite side from the propeller 10 (to the left in FIG. 1). The rotor of the electric motor 52 is mounted on a shaft 60.

The shaft 60 is rotationally guided about the axis A by means of an anti-friction bearing 61 (in this case a ball bearing) mounted between the shaft 60 and the immovable casing 32a.

The shaft 60 is independent of the shaft 30 of the first electric means 36.

The shaft 60 rotates a second nut 62 about the axis A by means of a speed-reduction gear 64, which is in this case also a planetary reduction gear. Said reduction gear 64 comprises a planetary shaft 64a connected for conjoint rotation with the shaft 60, an external ring gear 64b that surrounds the planetary shaft, and planet gears 64c that mesh with the planetary shaft 64a and the ring gear 64b and are supported by a planet carrier 64d. In a similar way to that described for the first electric means 36, the external ring gear 64b is rigidly connected to the second nut 62 in this case, whereas the planet carrier 64d is rigidly connected to the immovable casing 32a. In the example shown, the second nut 62 and the external ring gear 64b are formed as a single piece.

This configuration, in which the second nut 62 is fastened to the ring gear 64b and the planet carrier 64d is fastened to the immovable casing 32a, makes it possible to lock the second nut 62 when a reluctance torque is produced on the shaft 60 of the electric motor 52.

The part comprising the ring gear 64b and the nut 62 is centred and guided in the immovable casing 32a by a pair of anti-friction bearings 61, in this case ball bearings. These bearings 61 are angular contact bearings. They are inverted and mounted one next to the other at the nut 62. The second nut 62 is thus prevented from moving in translation relative to the immovable casing 32a by the bearings 61, which absorb the axial forces on the casing 32a.

A second transmission screw 68 passes through the second nut 62, which thus comprises a thread that is complementary to that of the screw. The second transmission screw 68 is rigidly connected to the movable casing 32b. In the example shown, the second transmission screw 68 is positioned at the opposite end of the movable casing 32b from the propeller 10, between the first electric means 36 and the second electric means 52. The second transmission screw 68 thus has a degree of translational liberty with respect to the movable casing 32b, but is prevented from rotating by being fastened to the movable casing 32b.

It should be understood that the rotation of the nut 62 (arrow θ' in FIG. 1) causes the transmission screw 68 to move in translation along the axis A (arrow X).

In a variant that is not shown, it could be the second transmission screw that is driven by the shaft 30 and the second nut 62 that is fastened to the movable casing. Advantageously, this screw/nut assembly has a reversibility function, like the first transmission screw 26, in that the rotatable member of said assembly is capable firstly of being subjected to a rotational torque by the actuator so as to engage with and translate the non-rotatable member, and secondly of being subjected in return to axial forces that cause it to rotate.

Therefore, the following should be understood in relation to the operation of the first transmission screw 26 and the first nut 28 in order to adjust the pitch of the blades of the propeller 10:

the operation of the motor 40a, 40b of the first means 25 leads to rotation θ of the transmission screw 26 by means of the reduction gear 44;

the operation of the motor 52 of the second means 50 causes an axial movement X of the transmission screw 26 by means of the movement of the second transmission screw 68 (or the nut 62 in the variant) and the movable casing 32b.

In this concept, in order to control the pitch of the propeller blades, only the first electric pitch control means 36 are actuated. The asynchronous motor 52 of the second means is arranged so as to have a residual reluctance torque for preventing the second nut 62 (or the screw 68 in the variant) from rotating under the effect of the responsive forces on the movable casing 32b. The screw 68 can also be prevented from rotating by a mechanical locking device. The movable casing 32b and the first transmission screw 26 are thus non-translatable in this case. It is the rotation of the first transmission screw 26 that adjusts the blade pitch; the second transmission screw 68 is passive.

By contrast, in order to control the movement of the eccentrics 20 by means of the second electric means so as to feather the blades by simply translating the second transmission screw 68, the first transmission screw 26 has to be prevented from being rotated θ by the response of the nut 28 subject to the external forces. When the blades are feathered, therefore, the first electric means 36 have to be actuated to produce a torque that is resistant to the rotation of the transmission screw 26.

FIG. 2 shows a second embodiment.

In this concept, the first transmission screw 26 (on the pitch control side) is provided with a mechanical system 90 for preventing rotation relative to the casing 32b. This system is, for example, a system of spring-mounted ball bearings housed in the casing. The planet carrier 42c applies an axial compression force to the balls. When the rotational torque exerted by the first pitch control means 36 on the planet carrier 42c reaches a predetermined threshold, the axial component of the compression force causes the balls to retreat into their compartment and releases the system 90 for preventing the first transmission screw 26 from rotating relative to the movable casing 32b. Above this threshold, the system 90 is reactivated automatically and prevents the transmission screw 26 from rotating. There is therefore no need to activate the first electric means during feathering in order to prevent the transmission screw 26 from rotating.

In this case, as described in relation to FIG. 2, the external ring gear 42b can be rigidly connected to the movable casing 32b, whereas the planet carrier 42d is rigidly connected to the transmission screw 26. Locking the planetary shaft 42a does not result in the planet carrier 42c being locked, and so a resisting torque produced by the first rotor 30 is insufficient for locking the transmission screw 26, but this function is actually ensured by the mechanical anti-rotation system 90 when the first electric motors are stationary.

Reference will now be made to FIG. 4, which schematically shows the circuit diagram of the operation of the system in FIG. 1 or 2.

The elements previously described are denoted using the same reference signs as in FIGS. 1 and 2.

FIG. 4 particularly shows the means for controlling the electrical machines of the system, namely, where the redundancy is applicable to all of these machines, two LVDT sensors 46, two resolvers 38a, 38b and two electric motors 40a, 40b.

The control means comprise in particular two separate electronic control units 54a, 54b that are each connected to a resolver, a sensor and an electric motor, and are able to independently control these machines.

The units 54a, 54b operate in "passive-active" mode. In nominal mode, the pitch is controlled by the electronic unit 54a, for example, and the electronic unit 54b is in passive mode. In the event of a malfunction detected by a position error, for example, the unit 54a is deactivated and the unit 54b is activated. The units 54a, 54b comprise three local interlocked servo-control loops: a torque loop using the phase-current measurements, a speed loop using the resolver, and a linear position loop using the LVDT sensor. The units 54a, 54b receive the position setpoint from computation units 56a, 56b, respectively, and are associated with electric networks 58a, 58b in order to send a current command to the motors 40a, 40b.

Although this is not shown in FIG. 2, the control means further comprise an independent electrical power supply device for the electric motor 52.

The architecture thus comprises two transmission chains—one 25 for controlling the blade pitch and the other 50 for the feathering. Each one comprises a transmission screw. Only one chain is active; the other is passive.

Indeed, when the pitch is being controlled, the electric means 36 are activated in order to rotate the first transmission screw. The second nut 62 is, for its part, prevented from rotating, either by the reluctance torque from the synchronous motor of the second means, or by activating an asynchronous motor of said second means to produce a resisting torque. The second transmission screw 68 is therefore passive in the second nut 62.

To control the movement of the eccentrics 20 by the second means 50 so as to feather the blades, the rotation θ' of the second nut 62 causes the second screw 68 and the movable casing 32b to move axially X. At the same time, a resisting torque prevents the first screw 26 from rotating; the screw is thus passive. According to the embodiments described, this torque is produced either by activating an asynchronous motor 40a of the first means 25, or by a mechanical anti-rotation device 90. The axial movement X of the first screw 26 in turn causes the eccentrics 20 to move axially, according to the operation of the decoupling mechanism described above.

If the transmission screw 26 of the pitch control chain 25 becomes locked in the nut 28 (problem B), the feathering chain 50 can provide the function of said screw and control the blade pitch by means of the mechanism described previously.

If the angular bearings 61 in the feathering chain become locked, the first electric means 36 can be used to adjust the pitch so as to bring about feathering. Indeed, in this case, the second transmission screw 68 is prevented from rotating, maintaining the pitch control chain assembly in a fixed position.

This electromechanical concept for the pitch actuation system is highly innovative as it offers the following advantages:

a simple and robust architecture having a minimum number of electromechanical components, whilst complying with the strict reliability criteria, elimination of the malfunction associated with a hydraulic leak, which would require the addition of counterweights for feathering, elimination of the counterweights from the prior art used to feather the blades, when the pitch is being controlled by the first control means, the movable casing 32b is stationary, meaning the electric means are not translated in this case, if one of the two transmission screws becomes locked, the translational control of the eccentric of the blades remains functional owing to the rotation of the transmission screw that is not locked, the use of an electromechanical feathering system makes it possible to use a simple control unit with better reliability.

In a third embodiment 22" of the invention, shown in FIG. 3, each transmission chain is capable of ensuring both the feathering function and the pitch control function. Each transmission chain comprises a machine 40"a, 52"a for controlling the pitch and a machine 40"b, 52"b for the feathering.

In this case, the feathering machines 40"b, 52"b are preferably asynchronous machines, so as to not produce resisting torque.

The pitch control machines 40"a, 52"a, on the other hand, are synchronous machines, arranged so as to have a resisting residual torque that can prevent the corresponding shaft 30, 60 from rotating under the forces in response to the activation of the actuator 24.

The resisting torque of the synchronous machine of the passive electric means, when the other means are active, serves as anti-rotation means for the screw 26 or corresponding nut 62.

This architecture comprises a total of four machines, i.e. one more than the other embodiments described. This embodiment is proposed for the following advantageous reasons:

the rotatable element of the screw/nut system of the transmission chain is locked by the residual resisting torque, allowing the other chain to control the translation of the eccentrics for the pitch control or feathering;

if the pitch control machine short-circuits, the pitch control machine of the other transmission chain is activated, meaning that the machines do not have to be excessively large in order to overcome the resisting torque generated by the short-circuit of the pitch control machine;

if the feathering machine short-circuits, the feathering machine of the other transmission chain is activated; the machines do not have to be excessively large to cover this case of short-circuiting because the technology selected for the feathering machine makes it possible to eliminate the resisting torque in the event of a short-circuit.

Owing to this embodiment, the size of the motors is much smaller and the reliability increased, albeit with the drawback of an additional motor. The benefit in terms of size and the drawback in terms of cost can be quantified by just one pre-design assessment. This electromechanical concept also provides the following considerable advantage: if one of the angular contact bearings on one of the two transmission chains becomes locked, the other transmission chain has the capacity to provide the feathering.

While illustrative embodiments have been illustrated and described, it will be appreciated that various changes can be made therein without departing from the spirit and scope of the invention.

The embodiments of the invention in which an exclusive property or privilege is claimed are defined as follows:

1. A pitch actuation system for a turbine engine propeller, comprising an actuator having a main transmission screw configured to be connected to blades of the propeller to rotate said blades relative to blade pitch axes, wherein the actuator is an electromechanical actuator comprising:
    the main transmission screw that is rotatable and movable in translation along a longitudinal axis;
    a main nut through which said main transmission screw passes and which engages the main transmission screw to move in translation along the longitudinal axis;
    a decoupling means comprising a ring surrounding the main nut, a first rolling bearing and a second rolling bearing, the first rolling bearing being mounted between the ring and the main nut, the second rolling bearing being mounted between the ring and an element configured to be connected to the blades, the decoupling means being configured such that when the main nut moves in translation, the pitch of the propeller blades changes but rotation of the propeller does not rotate the main nut;
    a blade pitch control means, comprising at least one electric motor configured to drive a first rotor about the longitudinal axis, the main transmission screw being rotated by said first rotor; and
    a blade feathering means, comprising at least one electric motor configured to drive a second rotor about the longitudinal axis, and a transmission device comprising a first member that is rotated by said second rotor and a second member that engages said first member to move in translation along the longitudinal axis,
    wherein the blade pitch control means are configured to transmit to the main transmission screw the translation of the second member of the transmission device of the blade feathering means.

2. The system according to claim 1, wherein at least one electric motor of the blade feathering means is configured to have a resisting reluctance torque that prevents the first member of the transmission device of the blade feathering means from rotating.

3. The system according to claim 1, wherein said at least one electric motor of the blade feathering means comprises a stator supported by a first immovable casing, and said at least one electric motor of the blade pitch control means comprises a stator supported by a second casing that is mounted solely so as to slide in translation along the longitudinal axis within the first immovable casing.

4. The system according to claim 1, wherein the main transmission screw is connected to an external ring gear of a first planetary reduction gear, the first rotor being connected to a planetary shaft of said first planetary reduction gear, and/or the first member of the transmission device of the blade feathering means is connected to an external ring gear of a second planetary reduction gear, the second rotor being connected to a planetary shaft of said second planetary reduction gear.

5. The system according to claim 4, wherein said blade pitch control means comprise at least one first electric motor configured to drive the first rotor, and a controller programmed to control said at least one first electric motor to apply a resisting torque that prevents the main transmission screw from rotating when the blade feathering means are activated.

6. The system according to claim 5, wherein said first electric motor of the blade pitch control means is an asynchronous motor.

7. The system according to claim 1, wherein the blade pitch control means comprise at least one mechanical device configured to prevent the main transmission screw from rotating, which mechanical device is arranged to engage when said at least one electric motor of said blade pitch control means is not applying any torque to the first rotor and to unlock as a result of axial forces exerted by said at least one electric motor on the first rotor.

8. The system according to claim 1, wherein the blade pitch control means comprise at least one electric motor arranged to have a resisting reluctance torque that prevents the main transmission screw from rotating.

9. The system according to claim 1, wherein each of said blade pitch control means and said blade feathering means comprises a first and a second electric motor for driving the same rotor, the first electric motor, being controlled by a controller programmed to control the blade pitch, the second electric motor being controlled by the controller to feather the blades.

10. The system according to claim 9, wherein the first electric motor is a synchronous motor and the second electric motor is an asynchronous motor.

11. A turbine engine comprising a propeller, the blades of which are variable-pitch blades, and a system according to claim 1, wherein the main nut drives a member that engages eccentrics provided on plates, the eccentrics supporting and rotating the blades.

12. The turbine engine according to claim 11, wherein the turbine engine is a turboprop engine.

13. A method for actuating the pitch of the blades of a turbine engine propeller with a system according to claim 1, the method comprising the steps of:
- adjusting the blade pitch by actuating the at least one electric motor of the blade pitch control means, in such a way that rotation of the first rotor leads to rotation of the main transmission screw,
- feathering the blades by actuating the at least one electric motor of the blade feathering means, in such a way that rotation of the second rotor causes the main transmission screw to move axially.

14. The system according to claim 1, wherein the first member of the transmission device is a nut, and the second member of the transmission device is a screw.

* * * * *

UNITED STATES PATENT AND TRADEMARK OFFICE
CERTIFICATE OF CORRECTION

PATENT NO. : 10,766,604 B2
APPLICATION NO. : 15/849464
DATED : September 8, 2020
INVENTOR(S) : H. De Wergifosse Page 1 of 1

It is certified that error appears in the above-identified patent and that said Letters Patent is hereby corrected as shown below:

In the Claims

| Column | Line | |
|--------|------|---|
| 14 | 59 | Please change "motor," to -- motor --. |

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*